Jan. 14, 1930.   C. DE WITT   1,743,439
STEEL POLE
Filed Dec. 20, 1927
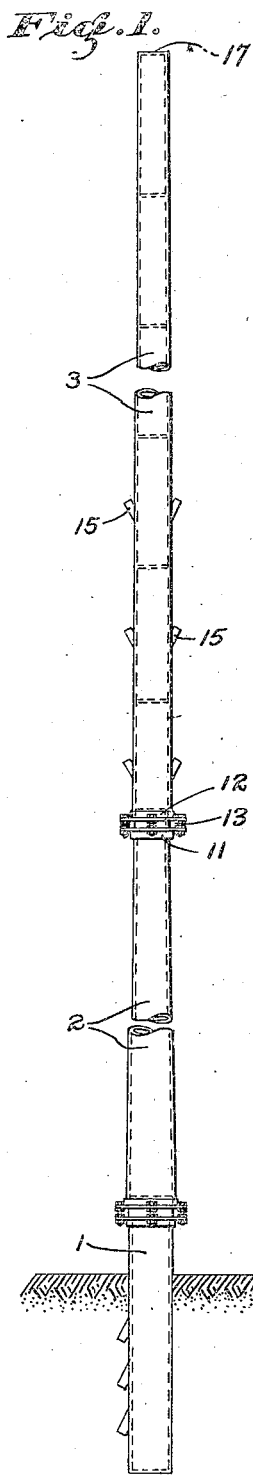
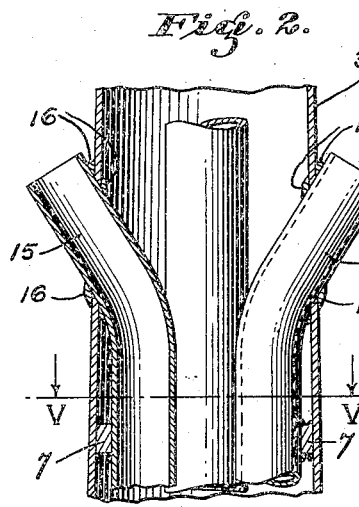
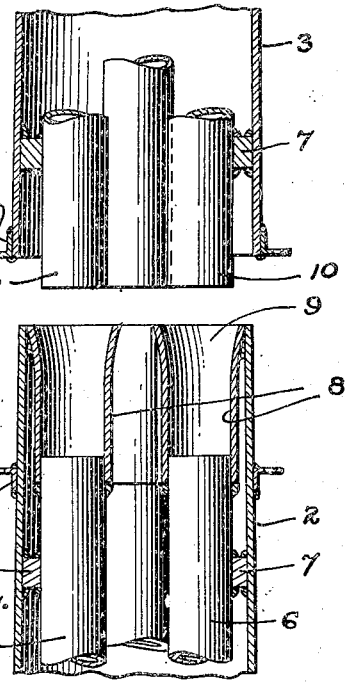
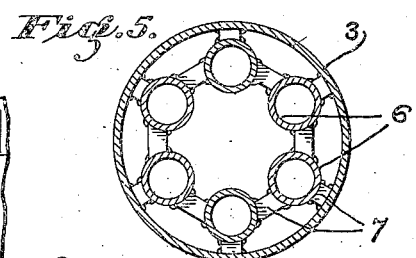
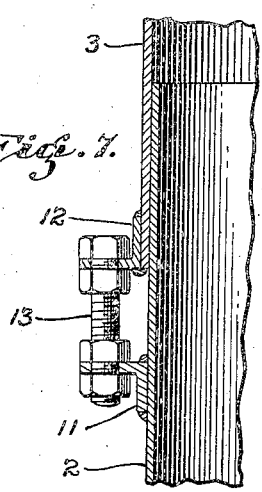
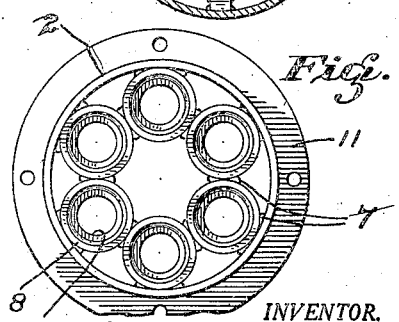
INVENTOR.
Clinton de Witt.
BY
Townsend, Loftus & Abbett
ATTORNEYS.

Patented Jan. 14, 1930

1,743,439

UNITED STATES PATENT OFFICE

CLINTON DE WITT, OF BERKELEY, CALIFORNIA, ASSIGNOR TO TAPER TUBE POLE CO., OF SAN FRANCISCO, CALIFORNIA, A CORPORATION OF CALIFORNIA

STEEL POLE

REISSUED

Application filed December 20, 1927. Serial No. 241,312.

This invention relates to tubular steel poles such as used for electric power transmission lines, telephone and telegraph poles, etc., and especially to a modified form of the steel pole shown in my co-pending application entitled "Steel pole," filed April 2, 1927, Serial No. 180,416.

The object of the present invention is to generally improve and simplify the construction and operation of poles of the character described; to provide a tubular pole enclosing a plurality of casings for the purpose of transferring electrical wires or cables from overhead to underground construction or vice versa; to provide a tubular pole enclosing a plurality of casings spot welded or otherwise secured to the inner surface of the pole and to each other to reinforce and promote rigidity in the pole structure; to provide a sectional tubular pole within enclosed casings in which the casings and tube sections form integral units; to provide a connection for each pole section which is telescopic in structure and which also permits simultaneous telescoping of the casings when two pole sections are telescoped and assembled; and further, to provide a tubular pole enclosing casings which are bent outwardly through openings in the pole section, either at the upper or lower end thereof to permit the entering or taking out of electrical wires or cables, the upper end outlets being arranged to direct the wires or cables to various cross arm positions and the lower ends to direct the cables into underground conduits, etc.

The invention is shown by way of illustration in the accompanying drawings, in which:

Fig. 1 is a side elevation of a pole, said side elevation being partly broken away, Fig. 2 is an enlarged vertical central section of that portion of the pole where the casings are bent outwardly to form outlets for the wires or cables extending through the pole, Figs. 3 and 4 are enlarged vertical longitudinal sections of the adjacent ends of two pole sections, said views showing the telescoping connection between the pole sections and also showing the telescoping connection between the casings within the pole sections, Fig. 5 is a cross section taken on line V—V, Fig. 2, Fig. 6 is a plan view of the upper end of the pole section shown in Fig. 4, Fig. 7 is an enlarged detail view showing the method of bolting two telescoping pole sections.

Referring to the drawings in detail and particularly Fig. 1, it will be noted that a tubular tapering sectional steel pole is illustrated. In the present instance the pole is shown as consisting of three main sections, such as indicated at 1, 2, and 3. The lowermost section is heaviest in construction, i. e., it is constructed of a heavy sheet metal and it is uniform in diameter throughout its length. The remaining sections indicated at 2 and 3 are also tubular but they taper from end to end so as to provide a series of telescoping sections. Each tapering section is constructed of steel or like material and the metal employed in each section is preferably decreased in thickness from the bottom to the top, i. e., the metal employed in the base section is the heaviest, the metal in the section indicated at 2 is slightly lighter, etc. The particular method of constructing each individual tubular section is of no material importance. Suffice it to say that each section may be made up of two half-sections which may be stamped or rolled and which are lapped, buttwelded or otherwise joined.

The description so far submitted describes a pole substantially identical to that illustrated in my co-pending application already referred to. The novel features to be considered in connection with the present application are as follows:—

First—A tubular pole such as described enclosing a plurality of pipes or casings which are integral therewith by welding or otherwise securing the casings or pipes interior of the tubular pole.

Secondly—A tubular pole of this character in which one end of the interior casings are bent outwardly through openings in the pole to form outlets or inlets for wires, cables, etc.

Third—A tubular pole consisting of sections which are adapted to telescope with relation to each other and each section enclosing a plurality of pipes or casings which are formed integral therewith and which are provided with telescoping connections so that a plurality of continuous interior conduits may be formed.

These several novel structural features are best illustrated in Figs. 2, 3, 4, 5 and 6. By referring to Figs. 3 and 4, it will be noted that the pole section 2 consists of a sheet metal shell, interiorly of which is mounted a plurality of pipes or casings, such as indicated at 6. These casings are spot welded or otherwise secured with relation to each other and the exterior shell, as indicated at 7. An integral structure is thus formed which, first of all, provides a plurality of interior conduits for the reception of wires, cables, etc. and secondly, which serves as a reinforcement to increase the rigidity and strength of the pole.

Interior casings 6 may be of any suitable number and they are of substantially the same length as the tubular pole section in which they are mounted. It is, however, desirable to form a series of unobstructed continuous conduits when the pole sections are assembled, as shown in Fig. 1, and a telescopic connection is thus provided in connection with the pipes or casings 6. This is best illustrated in Figs. 3 and 4. On the upper ends of the casings 6 are welded or otherwise secured sleeves, such as indicated at 8. These are flared or bell-shaped at their outer ends and are indicated at 9. The upper ends of the sleeves are welded to each other and to the pole section 2 and they may also be welded or otherwise secured to the upper ends of the casings 6. The lower ends of the casings 6 project beyond the end of the pole section, as shown at 10 in Fig. 3, and as such are adapted to project into the flaring ends 9 of the sleeves 8 when two pole sections are assembled. The upper end of the pole sections, shown at 2, has a diameter which permits it to telescope with relation to the lower end of the pole section indicated at 3, i. e., a telescopic connection is provided between each pole section and a telescopic connection is also formed between the upper and lower ends of each casing section. It should, furthermore, be noted that telescopic connections are formed simultaneously when two pole sections are assembled. Fig. 7 illustrates the telescoping connection between two pole sections. Angle iron flanges are welded to each pole section, as indicated at 11 and 12. These are perforated or slotted to receive bolts 13 and nuts are applied to each side of the angle iron flanges, as illustrated, so that each bolt may take any load imposed on the pole, either in tension or in compression. This feature will, however, not be elaborated upon as it forms the subject matter of my co-pending application.

Fig. 2 illustrates the method of bending the upper ends of the casings 6 where it is desired to return the wires or cables to cross arms or any other suitable superstructure, i. e., the upper ends of the casings are bent, as indicated at 15, and they are extended through openings formed in the pole. They are then welded at the points indicated at 16 and a rigid connection is formed which tends to reinforce the pole structure and it is of further importance as it excludes rain, dust, moisture, etc., the upper end of the uppermost pole section being also capped, as indicated at 17, to exclude extraneous matter such as referred to.

A pole of this character has been found to to be exceedingly rigid and substantially constructed. These poles are readily manufactured and they are easily assembled and erected in the field. The conduits due to the telescoping connections provided are unobstructed throughout their length, thus making it comparatively easy to enter and place the cables in position. Each pole section may be galvanized, both exteriorly and interiorly or it may be treated with asphalt coatings or the like, thus materially increasing the life of the pole. The thickness of sheet metal employed in the pole sections 2 and 3 may in this instance be reduced to a considerable extent in view of the internal reinforcement obtained by the casing sections 6, i. e., the metal in the pole sections may be reduced in gauge or thickness when compared with the structure in my co-pending application.

While certain features of the present invention are more or less specifically described, I wish it understood that various changes may be resorted to within the scope of the appended claims. Similarly, that the materials and finishes of the several parts employed may be such as the manufacturer may decide or varying conditions or uses may demand.

Having thus described my invention, what I claim and desire to secure by Letters Patent is:—

1. In a pole of the character described a tubular section, a plurality of casings within the section and secured therein to form a rigid structure, said casings being bent at one end and projecting through openings formed in the tube section, and a welded connection between the tube section and each casing to prevent entrance of extraneous matter.

2. A pole of the character described consisting of a plurality of tubular sections; a plurality of casings within each section and rigidly secured with relation to each other and the surrounding tube, the casings projecting beyond one end of each tube section; a sleeve secured to the opposite end of each casing, said sleeve being flared to telescopically receive the projecting casing ends of an adjacent tube section; and means adjacent the ends of the tube sections and mounted exterior thereof for securing the tube sections with relation to each other.

3. A pole of the character described consisting of a plurality of tubular sections; a plurality of casings within each section and rigidly secured with relation to each other and the surrounding tube, the casings projecting beyond one end of each tube section; a sleeve secured to the opposite end of each casing, said sleeve being flared to telescopically receive the projecting casing ends of an adjacent tube section; a telescopic connection between each tube section; exterior flanges on each telescopic section; and bolts extending through the flanges and adapted to secure the telescoping tube sections with relation to each other.

4. A pole of the character described consisting of a plurality of tubular sections, a plurality of casings within each section and rigidly secured with relation to each other and the surrounding tube sections; said casings projecting beyond one end of each tube section; an enlarged portion on the opposite end of each casing, said enlarged portion being flared to telescopically receive the projecting casing ends of an adjacent tube section; a telescopic connection between each tube section; and means on the exterior of each tube section for rigidly connecting the telescoping ends of the tubes.

5. A post or pole adapted to be positioned vertically for supporting and containing electric conductors, comprising a tubular shell, a plurality of metallic conduits disposed longitudinally of the shell, and extending from points near one end of the pole to points intermediate the ends thereof, said conduits being adapted to contain electric conductors and said shell being provided with openings intermediate its ends, angular end portions on said conduits, extending through said openings in the shell, and means to secure the projecting end portions of the conduit to the walls of the shell and form a connection therebetween sufficiently tight to exclude extraneous matter.

CLINTON DE WITT.